(12) United States Patent
Trotter

(10) Patent No.: US 12,187,433 B2
(45) Date of Patent: Jan. 7, 2025

(54) LIGHTWEIGHT LOW-PROFILE VENT SYSTEMS FOR AIRCRAFT FLUID DISPERSION TANKS

(71) Applicant: Victor D. Trotter, Fort Worth, TX (US)

(72) Inventor: Victor D. Trotter, Fort Worth, TX (US)

( * ) Notice: Subject to any disclaimer, the term of this patent is extended or adjusted under 35 U.S.C. 154(b) by 589 days.

(21) Appl. No.: 17/520,021

(22) Filed: Nov. 5, 2021

(65) Prior Publication Data

US 2023/0146980 A1 May 11, 2023

(51) Int. Cl.
*B64D 1/16* (2006.01)
*A62C 3/02* (2006.01)

(52) U.S. Cl.
CPC .............. *B64D 1/16* (2013.01); *A62C 3/0235* (2013.01)

(58) Field of Classification Search
CPC ... A62C 3/0228; A62C 3/0235; A62C 3/0242; B64D 1/16
USPC ........................................................... 169/53
See application file for complete search history.

(56) References Cited

U.S. PATENT DOCUMENTS

| | | | | |
|---|---|---|---|---|
| 1,673,087 A * | 6/1928 | Morse | ...................... | B64D 1/16 222/189.09 |
| 2,043,262 A * | 6/1936 | Oglesby | ................... | B64D 1/16 244/136 |
| 2,924,040 A * | 2/1960 | White | ...................... | B64D 1/16 239/654 |
| 3,423,053 A | 1/1969 | Hawkshaw | | |
| 5,279,481 A | 1/1994 | Trotter et al. | | |
| 5,967,462 A | 10/1999 | Foster et al. | | |
| 8,365,762 B1 | 2/2013 | Trotter | | |
| 10,350,441 B2 | 7/2019 | Cordani et al. | | |
| 11,046,433 B2 | 6/2021 | Trotter | | |
| 2012/0107630 A1 | 5/2012 | Reabe | | |
| 2013/0126677 A1 | 5/2013 | Mark et al. | | |
| 2014/0000917 A1 * | 1/2014 | Stupakis | ................ | B64U 20/70 169/53 |

(Continued)

OTHER PUBLICATIONS

AT-802F, Drawing of rod-actuated vent, 1 page, shows rod-actuated vent that's been known and used by Air Tractor in US in year 2019 and earlier.

(Continued)

*Primary Examiner* — Cody J Lieuwen
(74) *Attorney, Agent, or Firm* — bobharter.com; Robert J. Harter

(57) ABSTRACT

In the field of agriculture and aerial firefighting, some example vent systems for aircraft fluid dispersion tanks include a vent-well recessed below the top of the tank. When a gate valve assembly below the tank opens to release fluid for dispersion along the aircraft's trailing flight path, the vent system prevents a detrimental vacuum from developing within the tank. In some examples, a recessed vent exploits the Coanda effect to direct air into the tank without obstructing the pilot's view. In some examples, a low profile scoop above the vent further promotes airflow with minimal visual obstruction. In addition or alternatively, some example vent systems include a lightweight cable connecting the gate valve assembly to a spring-loaded vent. The cable pulls the vent open in response to the gate opening to release fluid. When the gate closes, the cable becomes slack, which allows the spring to close the vent.

20 Claims, 11 Drawing Sheets

(56) References Cited

U.S. PATENT DOCUMENTS

2020/0010196 A1    1/2020   Trotter
2020/0148358 A1*   5/2020   Reabe ................... E05F 15/53

OTHER PUBLICATIONS

Transland Vent; Pivotal Vent, drawn by Marselos, torsion spring loaded, vacuum actuated, one page, dated Jul. 31, 2001.
Transland; Demand Vent; Engineering Drawing; spring-loaded translating vent, one page; dated Jul. 13, 2011.
International Preliminary Report on Patentability, 5 pages, May 16, 2024.
International Search Report, issued in connection with PCT/US22/47347, mailed Jan. 31, 2023, 7 pages.

* cited by examiner

LIGHTWEIGHT LOW-PROFILE VENT SYSTEMS FOR AIRCRAFT FLUID DISPERSION TANKS

FIELD OF THE DISCLOSURE

This patent generally pertains to agricultural and firefighting product dispersal systems of aircraft and more specifically to means for venting the tanks that contain the product.

BACKGROUND

Some aircraft (e.g., airplanes and helicopters) are used as crop dusters or air tankers for agricultural and/or firefighting purposes. Such aircraft typically include a bulk container (e.g., a tank or a hopper) for carrying a flowable bulk product, such as dry fertilizer, liquid fertilizer, pesticide, fire extinguishing liquid, water, etc.

To selectively release the product, in some examples, a linkage assembly connects a manually operated lever in the cockpit to a movable gate at an outlet of the bulk container. The pilot operates the lever to open and close the gate, and thereby controls the release of the bulk product. When released, the bulk product is dispersed along the aircraft's trailing flight path. A vent near the top of the container can facilitate the release of product from the container.

DETAILED DESCRIPTION

Figure 1:
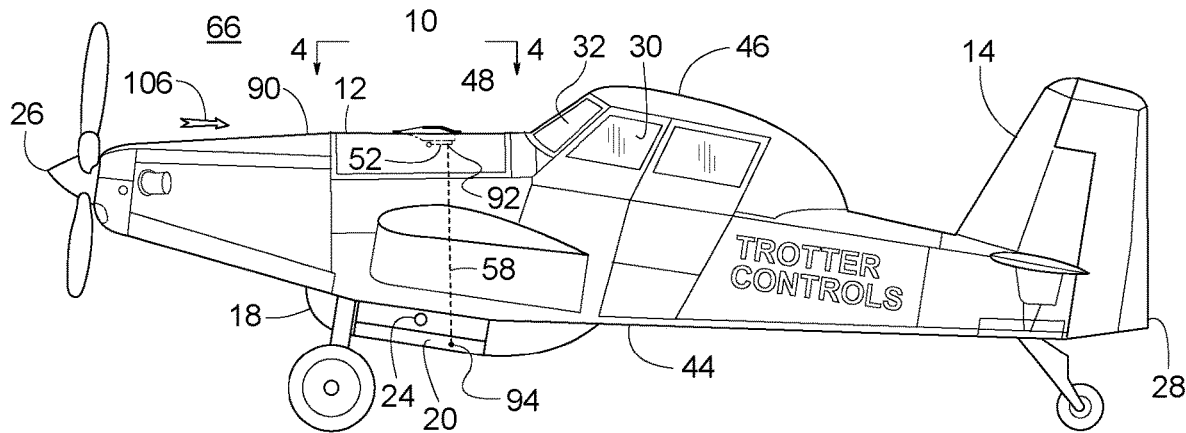
FIG. 1 is a side view of an example aircraft with an example vent system constructed in accordance with the teachings disclosed herein, wherein the vent system is shown closed.
Figure 2:
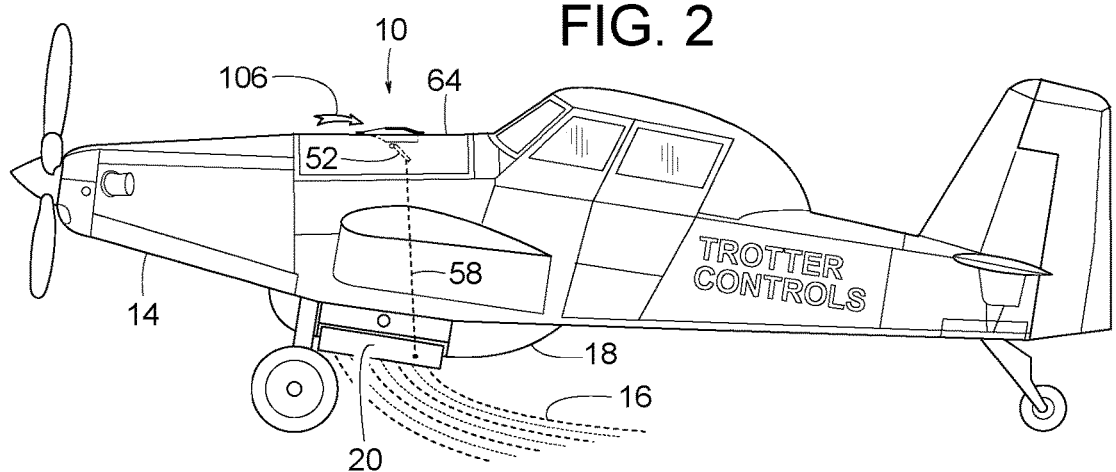
FIG. 2 is a side view similar to FIG. 1 but showing the aircraft dispersing fluid while the vent system is open.

FIGS. 1-9 pertain to a vent system 10 for a fluid dispersion tank 12 of an aircraft 14, wherein aircraft 14 is used for dispersing a fluid 16 or other flowable product while in-flight. A gate valve assembly 18 at the bottom of tank 12 includes at least one gate 20 that opens to release fluid 16 from tank 12. Gate 20 is movable between a closed position (FIGS. 1, 4, 5, 7, 11 and 12) to retain fluid 16 and an open position (FIGS. 2, 6, 8, 9, and 10) to release fluid 16. When gate 20 opens, it releases fluid 16 from tank 12 while vent system 10 prevents a detrimental vacuum from developing within tank 12. The released fluid 16 is dispersed along the aircraft's trailing flight path. Such a system is particularly suited for agricultural and firefighting purposes.

The term, "aircraft" refers to any flying machine. Some examples of aircraft 14 include an aerial crop duster, air tanker, an airplane, a helicopter, an Air Tractor AT402, an Air Tractor AT502, an Air Tractor AT602, an Air Tractor AT802A, an Air Tractor AT802F, a Thrush aircraft, and a Dromodier aircraft.

The term, "fluid" refers to any product or material that can flow. Some examples of fluid 16 include a liquid, granules, particles, seed, powder, water, chemical mixtures, fertilizer, pesticide, and fire retardant.

The term, "tank" refers to any hollow structure for containing a fluid. Some examples of tank 12 include a vessel, a hopper, a container, a receptacle, etc. In the illustrated examples, tank 12 defines a chamber 22 for containing fluid 16. In some examples, tank 12 is filled with fluid 16 through a fill valve 112 at a port 24 on either tank 12 or gate assembly 18.

The term, "gate" refers to any member that can be moved relative to an opening to vary the flow of a fluid through the opening or selectively stop (or substantially stop) the flow. Some example gates include plates, plugs, flaps, diaphragms, etc. Some example modes of gate movement include translating, pivoting, expanding, contracting, bending, and various combinations thereof. Some examples of gate assembly 18 include those disclosed in U.S. Pat. No. 11,046,433 and U.S. patent application Ser. Nos. 17/202,577 and 17/386,721; all of which are specifically incorporated herein by reference. In some examples, gate 20 is a 5-inch, 7.5-inch or 10-inch wide gate provided by Transland of Wichita Falls, Texas. In some examples, gate 20 is one of a series of gates in a gate assembly, wherein the gates open and close in unison. Gate 20 and gate assembly 18 are schematically illustrated in FIGS. 5-12.

Figure 3:
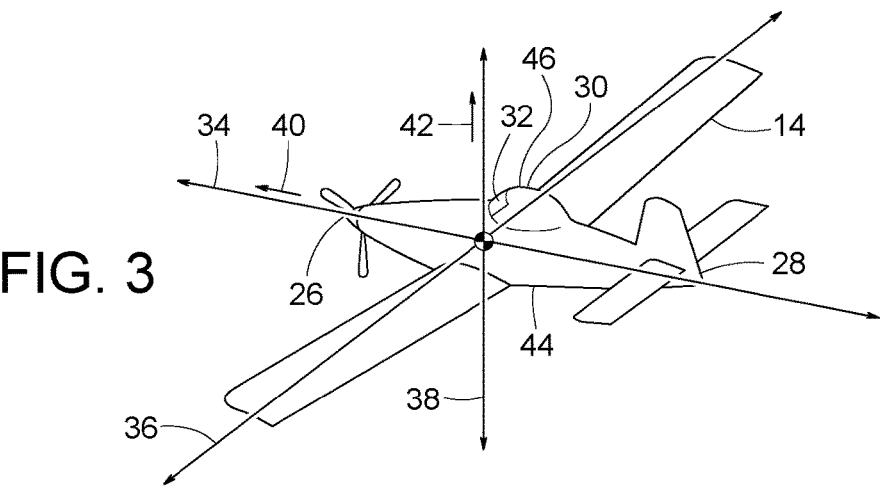
FIG. 3 is a perspective view showing various axes of an aircraft.
Figure 4:
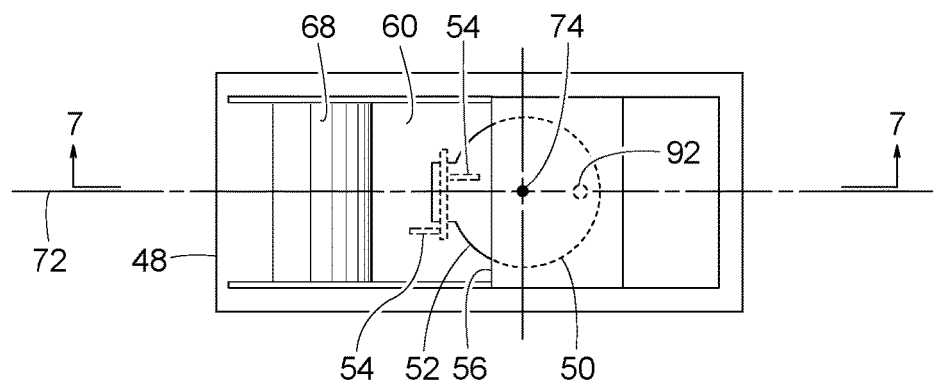
FIG. 4 is a cross-sectional view taken along line 4-4 of FIG. 1.
Figure 5:
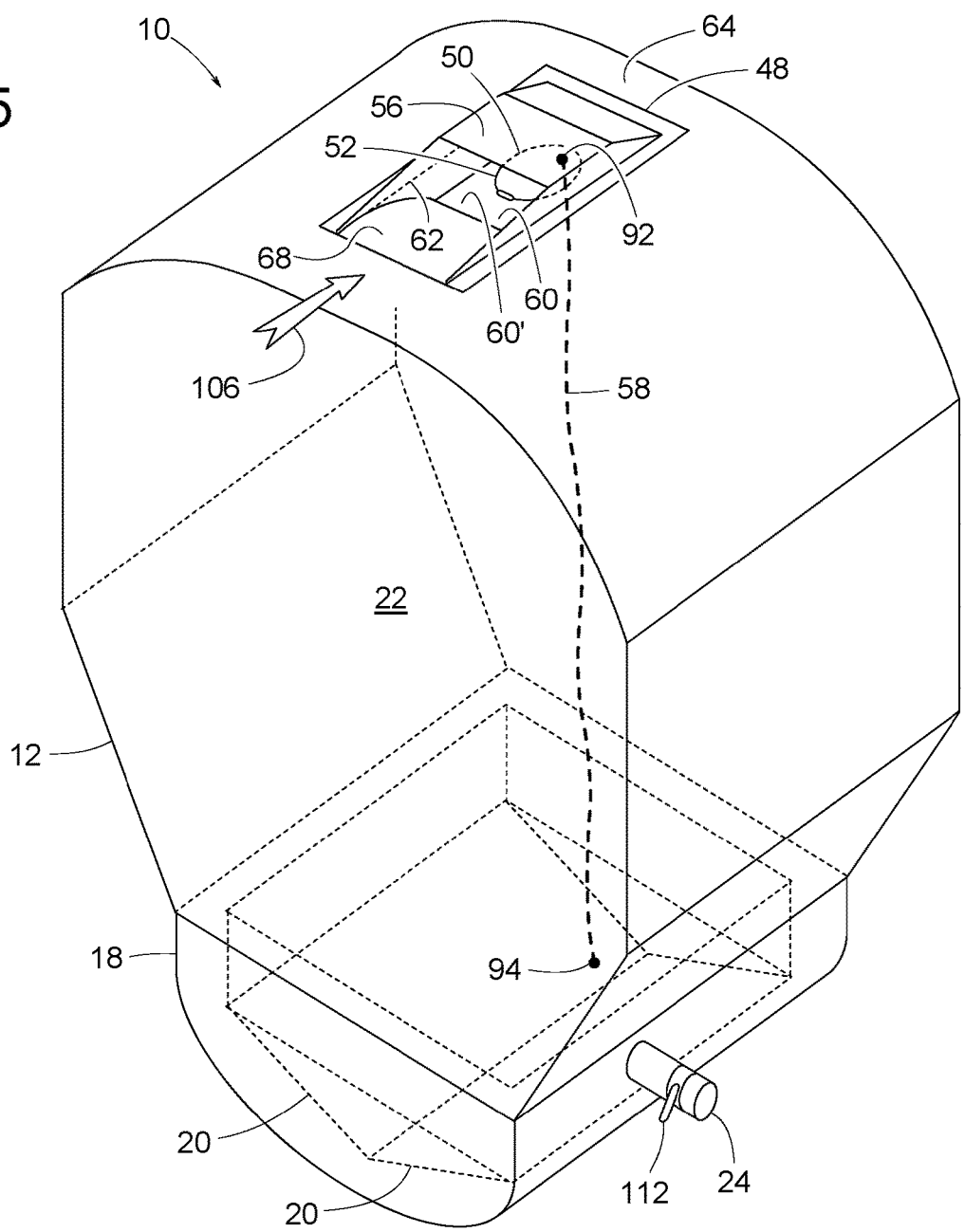
FIG. 5 is a perspective view of the example vent system shown in FIG. 1, wherein parts of a tank and gate valve assembly are schematically illustrated.
Figure 6:
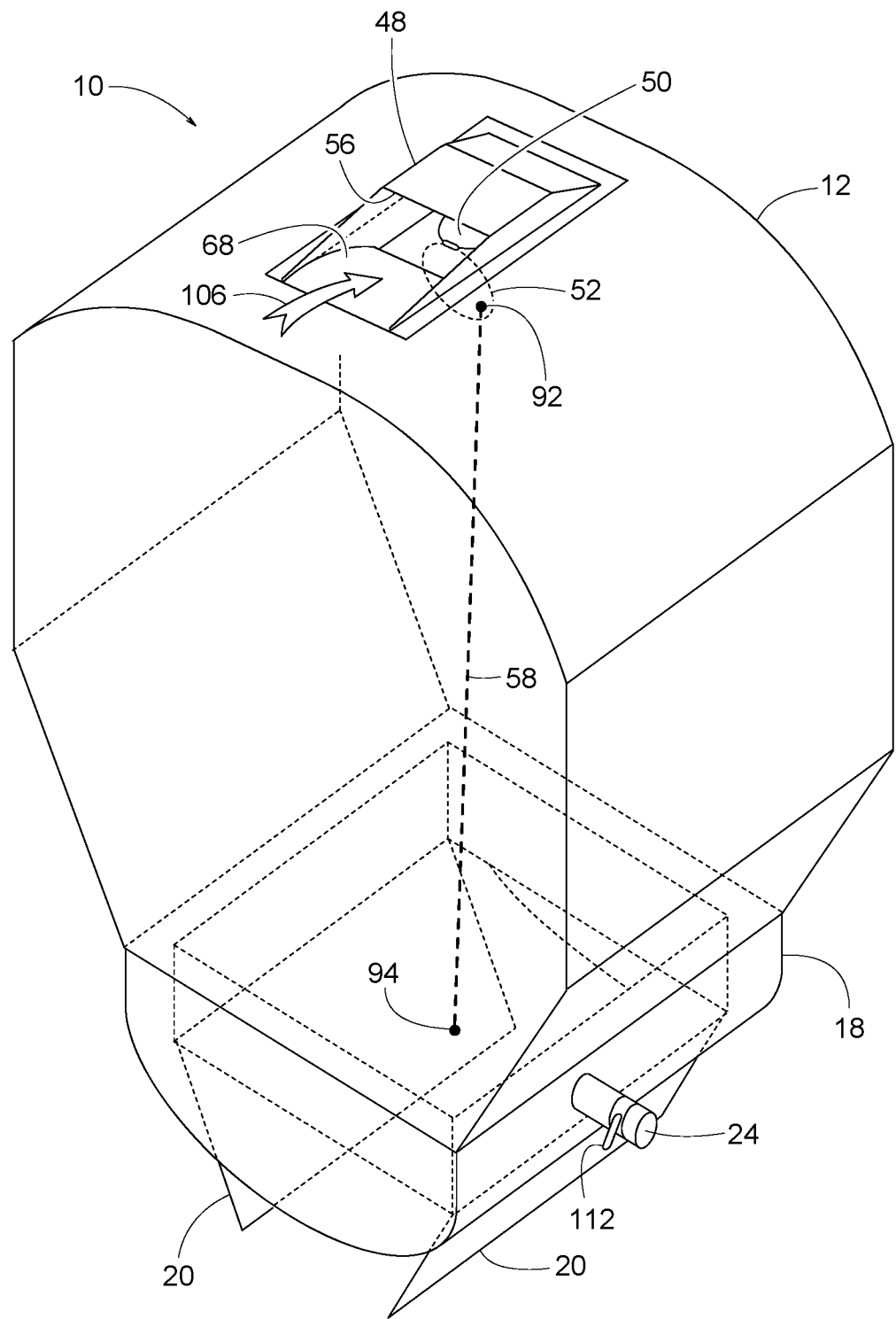
FIG. 6 is a perspective view similar to FIG. 6 but showing the vent system open.
Figure 7:
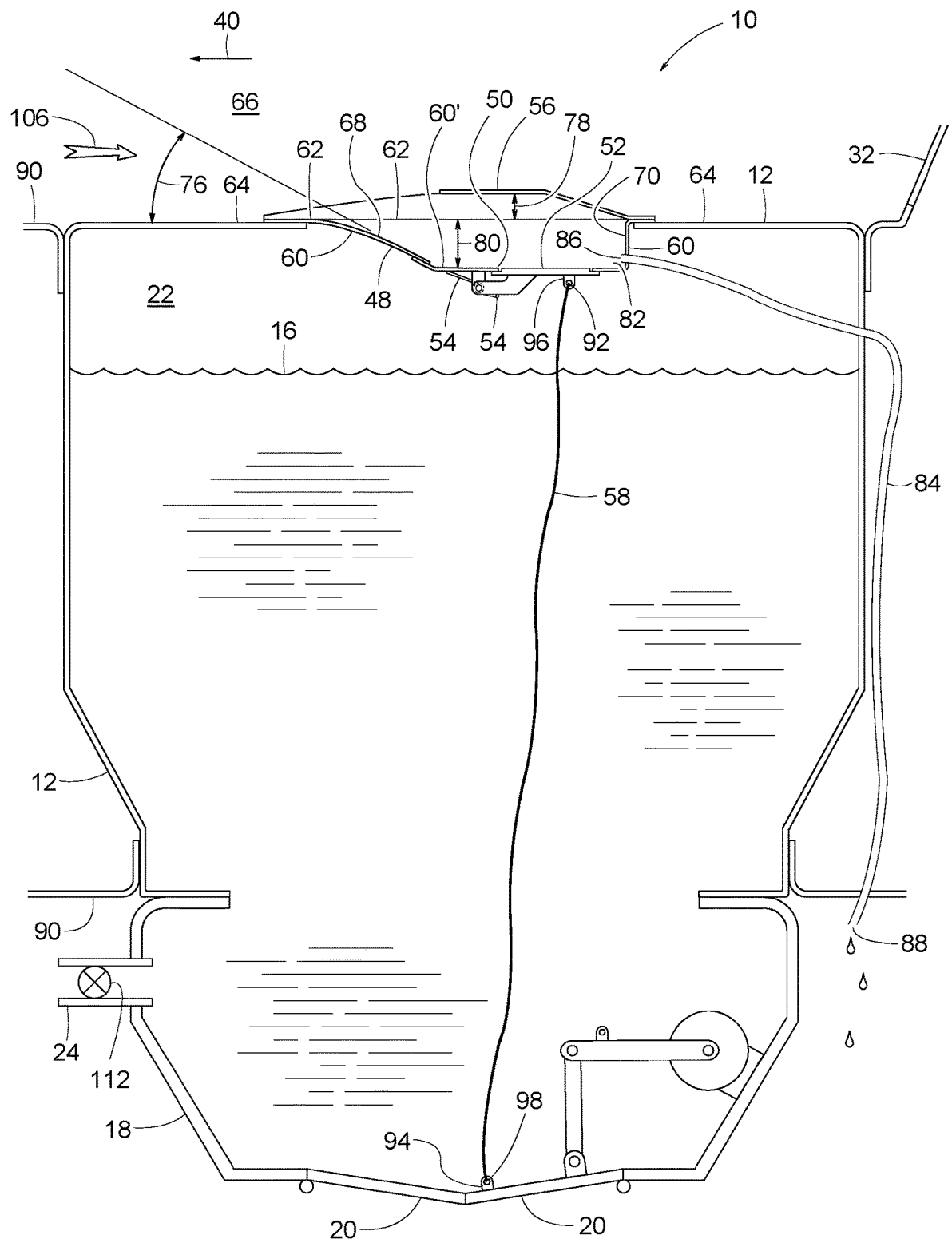
FIG. 7 is a cross-sectional side view of an example vent system constructed in accordance with the teachings disclosed herein.
Figure 8:
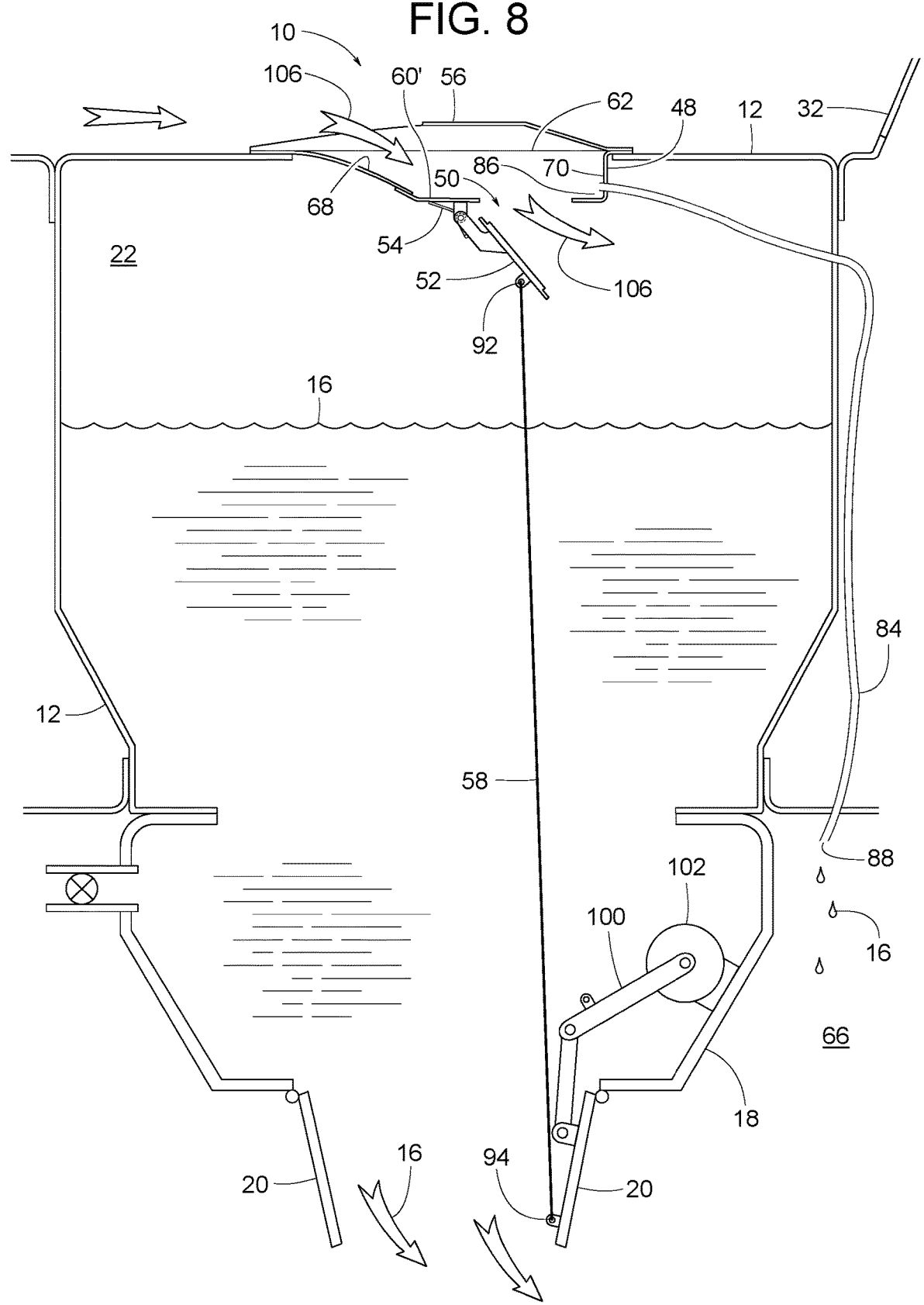
FIG. 8 is a cross-sectional side view similar to FIG. 7 but showing the vent system open while operating in a second mode of operation.

For describing physical orientations and relative positions, certain components of vent system 10 are described herein with reference to known orthogonal axes of aircraft 14, as shown in FIG. 3. FIG. 3 shows aircraft 14 comprising a nose 26, a tail 28, a cockpit 30, and a windshield 32. Aircraft 14 defines a roll axis 34, a pitch axis 36, and a yaw axis 38. Aircraft 14 extends lengthwise along roll axis 34 in a forward direction 40 from tail 28 to nose 26. Windshield 32 faces generally in forward direction 40. Aircraft 14 extends laterally widthwise along pitch axis 36. Aircraft 14 extends along yaw axis 38 in an upward direction 42 from a lower portion 44 of aircraft 14 to an upper portion 46 of aircraft 14. Cockpit 30 is between tail 28 and nose 26 with respect to roll axis 34. Roll axis 34, yaw axis 38, and pitch axis 36 lie perpendicular to each other.

In some examples, vent system 10 comprises a vent 48 defining an aperture 50 through tank 12, a vent member 52 for selectively opening and blocking aperture 50, a vent closure spring 54 for urging vent member 52 to a closed sealed position (FIGS. 1, 4, 5, and 7), a scoop 56 extending at least partially over aperture 50, and a slender member 58 coupling vent member 52 to gate valve assembly 18. The term, "vent member" refers to any structure for selectively blocking and unblocking an aperture. A few examples of vent member 52 include a plate, a disc, a plug, a diaphragm, a ball, a flap, a cone, a partially spherical body, etc. Some example modes of vent member movement include translating, pivoting, expanding, contracting, bending, and various combinations thereof.

Some examples of vent 48 comprise an inlet well 60 extending down into the tank's chamber 22 toward the vent's aperture 50. Inlet well 60 has a brim 62 at an upper surface 64 of tank 12. Brim 62 is the outer periphery of inlet-well 60. In some examples of vent 48, a lower end 60' of inlet-well 60 defines aperture 50 between the tank's chamber 22 and an outside atmosphere 66 surrounding aircraft 14. In some examples, inlet-well 60 includes an upstream surface 68 and a downstream surface 70. Aperture 50 and downstream surface 70 are behind upstream surface 68 with respect to the forward direction 40 along roll axis 34. In some examples, upstream surface 68 extends downward from brim 62 toward aperture 50, and downstream surface 70 extends upward from aperture 50. In some examples, inlet well 60 is 3D printed and is comprised of carbon fiber reinforced polypropylene.

In some examples, upstream surface 68 is sloped more gradually than downstream surface 70, as viewed along an imaginary plane 72, wherein imaginary plane 72 is defined as intersecting a centerpoint 74 of aperture 50 and lying perpendicular to pitch axis 36. In some examples, the aperture's centerpoint 74 is laterally centered relative to aircraft 14 and roll axis 34. In other examples, the aperture's centerpoint 74 is laterally offset to the left or right of roll axis 34. Some examples of vent system 10 include two vents 48 or 48' on either side of roll axis 34. Some examples of vent system 10 include more than two vents 48 or 48'.

In some examples, the gradual slope of upstream surface 68 promotes a beneficial Coanda effect, whereby upstream surface 68 tends to draw air to itself and thereby effectively direct that air down toward aperture 50. In some examples, upstream surface 68 curves smoothly along imaginary plane 72 to gradually direct the airflow downward. In some examples, upstream surface 68 is substantially linear along imaginary plane 72 to simplify manufacturing of vent 48. In some examples, upstream surface 68 lies at an acute angle 76 of less than 45 degrees to roll axis 34 to promote the Coanda effect.

Inlet-well 48 placing aperture 50 at a recessed elevation below the tank's upper surface 64 in combination with the Coanda effect enables vent 48 to draw an ample amount of air down through aperture 50 and into tank 12 without creating a prominent upward protrusion that could otherwise significantly obstruct a pilot's view. In some examples, however, a relatively low-profile scoop 56 can be added to increase the airflow through aperture 50 and to help shield windshield 32 from backsplash when vent 48 is open.

Figure 10:
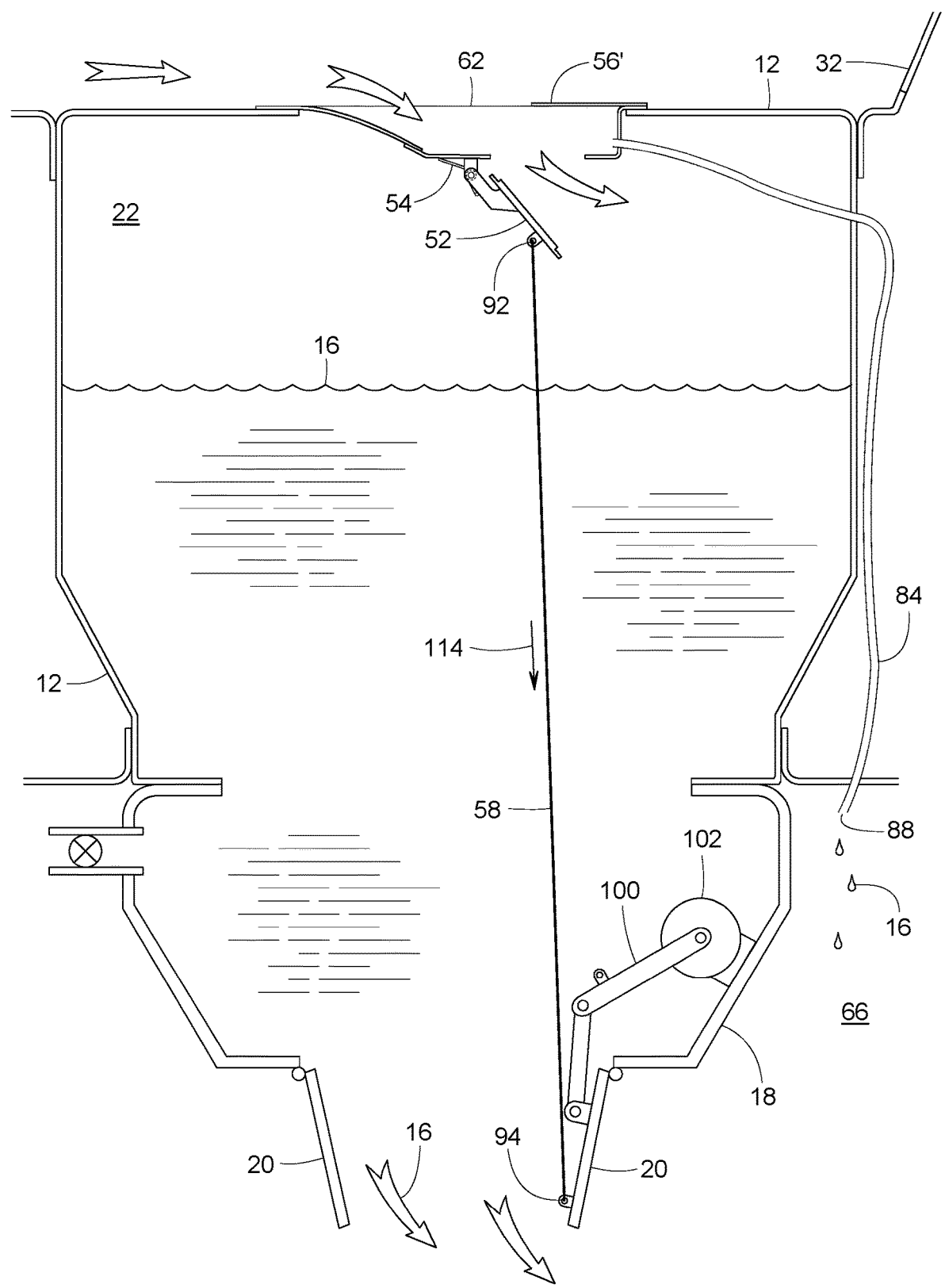
FIG. 10. is a cross-sectional side view similar to FIG. 8 but showing an even lower profile vent system constructed in accordance with the teachings disclosed herein.

To minimize obstructing the pilot's view, some examples of scoop 56 extend only a certain height 78 above brim 62, wherein certain height 78 is less than a well-depth 80 of inlet-well 60. In some examples, well-depth 80 is preferably at least one inch lower than brim 62 to realize the benefit of a recessed vent. In some examples, the certain height 78 is less than three inches to avoid creating a significant obstruction to the pilot's view. In some examples, the scoop's certain height 78 is less than two inches, and well-depth 80 is greater than two inches to provide a good compromise between vent inlet airflow and minimal obstruction to the pilot's view. In some examples, the scoop's height 78 is about 1.5 inches, and well-depth 80 is about three inches for best results. To realize at least a minimal benefit of aperture 50 being recessed, inlet-well 60 at aperture 50 is at least one inch lower than brim 62. In some examples, as shown in FIG. 10, a scoop 56' has a certain height 78 that is substantially equal to zero (i.e., scoop 56' is substantially flush with brim 62).

To further increase vent airflow while reducing backsplash, some examples of scoops 56 and 56' extend in forward direction 40 out over aperture 50. With the addition of scoop 56 or 56', some backsplash of fluid 16 might collect in a lower rear area 82 of vent-well 60. In some examples, a drain tube 84 can be used for draining this collection of fluid 16.

In some examples, drain tube 84 has an inlet 86 and an outlet 88. Inlet 86, in some examples, is in fluid communication with inlet-well 60 at a point in lower rear area 82 above aperture 50 and below brim 62. In some examples, the drain tube's outlet 88 is below the tube's inlet 86 and below aperture 50. In some examples, drainage of fluid 16 through drain tube 84 is directed back into tank 12, directed down into a separate waste collection tank, or simply released into the surrounding atmosphere 66. The term, "tube" refers to any fluid passageway. Some examples of a tube include a pipe, a hose, a conduit, a drilled hole, a channel, a gutter, and various combinations thereof.

In some examples, to reduce assembly costs and avoid leakage points, inlet-well 60 is integrally formed seamlessly in the tank's upper surface 64. In such examples, inlet-well 60 and the tank's upper surface 64 are both made of the same material. In some examples, the tank's upper surface 64 is part of a lid that is hinged to the rest of tank 12, whereby the hinged lid provides access to chamber 22.

In some examples, tank 12 adjoins a cowl 90 of aircraft 14. In some examples, cowl 90 is comprised of a first material (e.g., aluminum alloy), tank 12 and inlet-well 60 are each comprised of a second material (e.g., a polymer, fiberglass, or some other composite), and the first material is different than the second material. The two materials being different from each other allow the use of optimal materials each being uniquely suitable for an aircraft cowl and a tank's wall.

In some examples, vent closure spring 54 urges vent member 52 to its closed position. Vent closure spring 54 is schematically illustrated to represent any resilient member capable of urging vent member 52 to its closed position. Some examples of vent closure spring 54 include a torsion spring, a compression spring, an extensions spring, a leaf spring, a constant force spring, an elastic cord, an elastic strap, a pneumatic spring, a bellows, etc. In some examples, a certain level of vacuum (e.g., −0.5 psig) in chamber 22 overcomes vent closure spring 54 and thereby forces vent member 52 to its open position. A vacuum of −0.5 psig, however, can delay the release of fluid 16 out from within tank 12.

To overcome this problem, some examples of vent system 10 include slender member 58. The term, "slender member" refers to any elongate structure having a length that is at least ten times greater than its width. Some examples of slender member 58 are rigid. Other examples of slender member 58 are more flexible or pliable. Some examples of slender member 58 include a cable, a chain, a nylon strap, an elastic strap, an extension spring, a wire, a rope, a cord, a rod, a bar, a linkage, a linkage assembly, a tube, and various combinations thereof.

In some examples, slender member 58 couples vent member 52 to gate valve assembly 18 such that gate 20 moving between the closed position and the open position causes vent member 52 to move respectively between its sealed position and the unsealed position. In some examples, vent closure spring 54 holds vent member 52 at the sealed position when gate 20 is in its closed position. In some examples, slender member 58 overpowers vent closure spring 54 to force vent member 52 to its unsealed position when gate 20 is in the open position.

In some examples, when gate 20 is in the closed position, slender member 58 is slack (FIGS. 5 and 7), which allows vent closure spring 54 to close vent member 52 without appreciable resistance from slender member 58. In some examples, when gate 20 is in the open position, slender member 58 is taut (FIGS. 6, 8, and 9) and forces vent member 52 to its unsealed position.

It should be appreciated by those of ordinary skill in the art that points 92 and 94 to which slender member 58 respectively connects to vent member 52 and gate valve assembly 18 can be at any suitable locations. In some examples, point 92 is on a lug 96 extending from vent member 52. In some examples, point 94 is on a lug 98 extending from gate 20, as shown in FIGS. 5, 6, 7, and 8. In some examples, as shown in FIG. 9, point 94 can be attached to a link 100 connecting gate 20 to a gate actuator 102.

Gate actuator 102 is schematically illustrated to represent any means for powering the movement of gate 20. Some examples of gate actuator 102 include a motor, a hydraulic cylinder, a gearbox, a linkage assembly, and various combinations thereof. In some examples, a linkage assembly, gears, or some other mechanism couples multiple gates 20 to gate actuator 102, so the multiple gates 20 open and close in unison.

Figure 9:
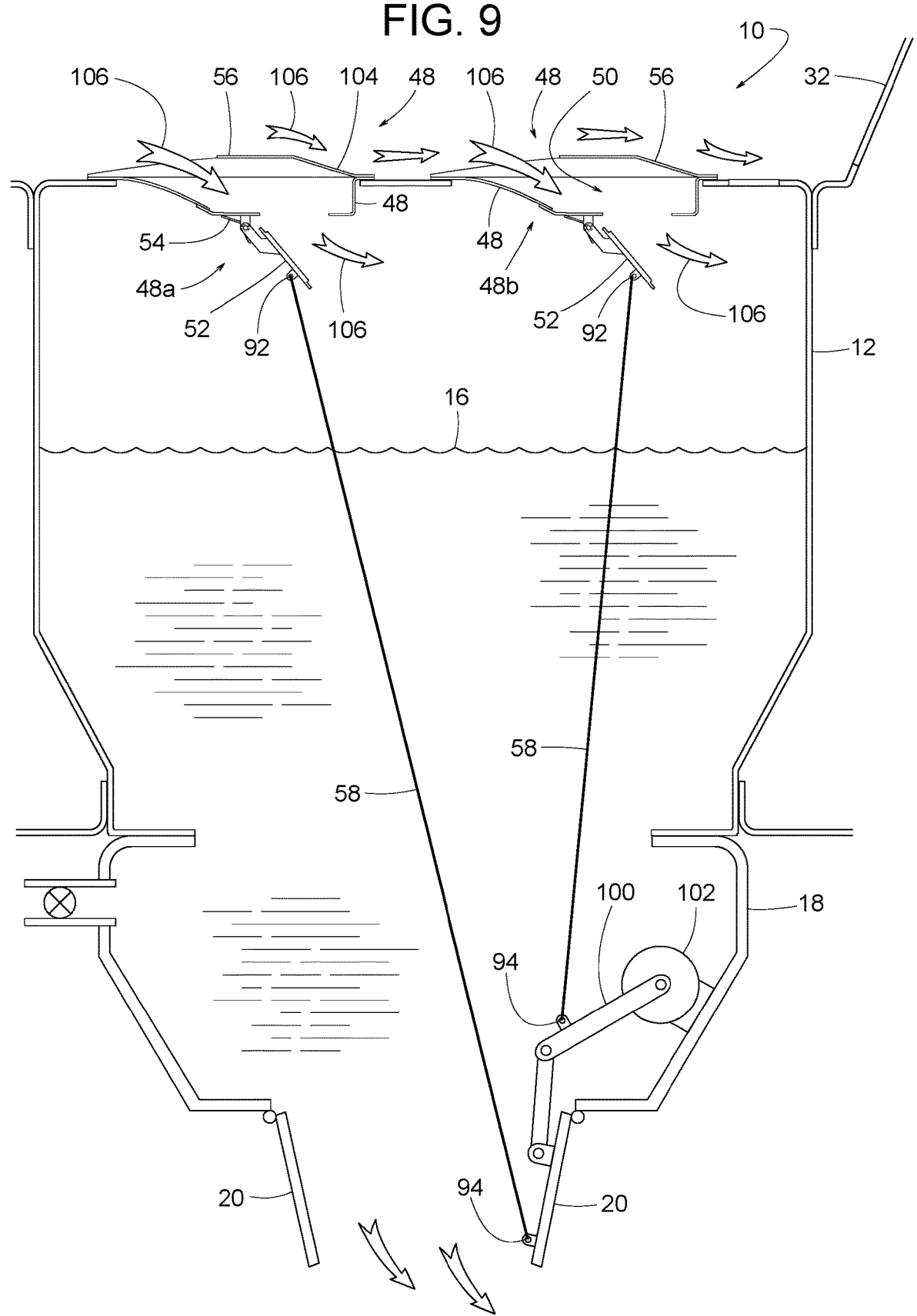
FIG. 9 is a cross-sectional side view similar to FIG. 8 but showing the scoop of an upstream vent directing air into a downstream vent.

In some examples, vent system 10 includes two or more vents 48, as shown in FIG. 9. In some examples, vent system 10 includes a front vent 48a and a rear vent 48b. In some examples, each vent 48a and 48b are substantially identical to vent 48. Vents 48a and 48b have a strategic tandem arrangement such that an upper surface 104 of the front vent's scoop 56 utilizes the Coanda effect to direct air 106 into an inlet 50 of the rear vent 48b. In some examples, rear vent 48b can capture backsplash that might escape front vent 48a, thus minimizing the amount of backsplash that might otherwise reach windshield 32.

Figure 11:
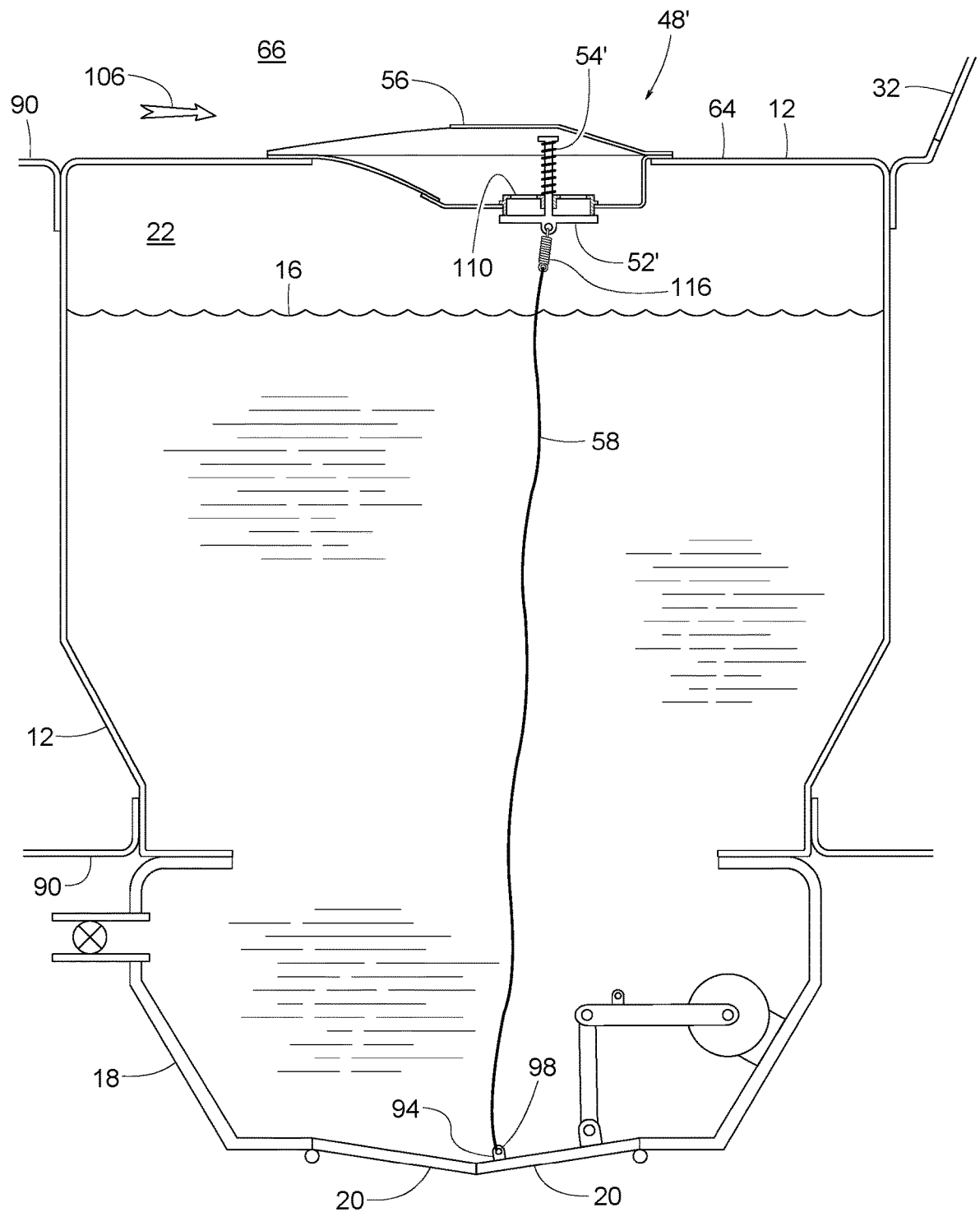
FIG. 11 is a cross-sectional side view similar to FIG. 7 but showing another example vent constructed in accordance with the teachings disclosed herein.
Figure 12:
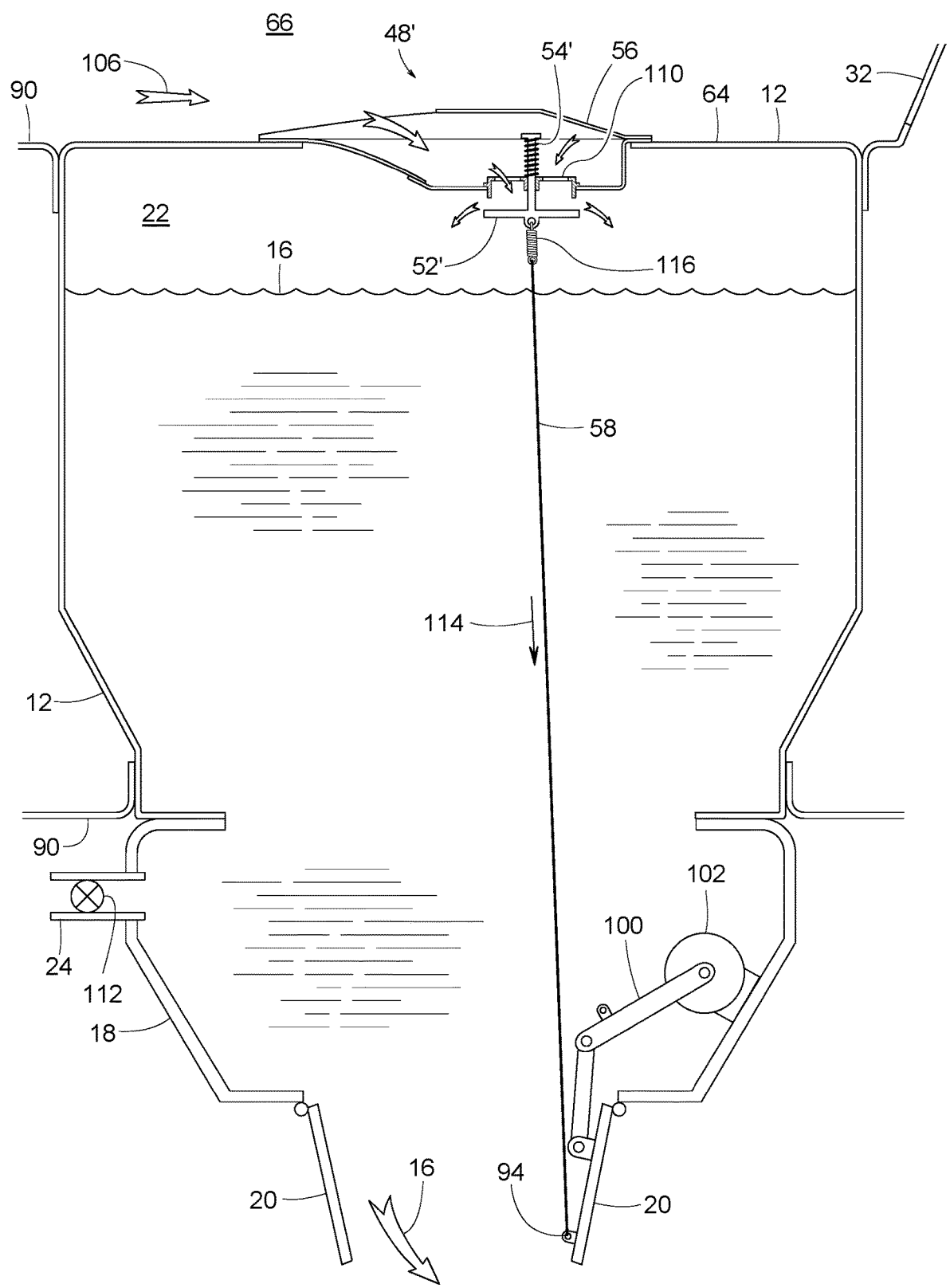
FIG. 12 is a cross-sectional side view similar to FIG. 11 but showing the vent in an unsealed position while operating in a second mode of operation.

In the example shown in FIGS. 11 and 12 an example vent member 52' in the form of a vertically translating plate and an example vent closure spring 54' is in the form of a compression spring. Vent closure spring 54' urges vent member 52' to its sealed position (FIG. 11). When gate 20 opens, slender member 58 pulls vent member 52' to its unsealed position (FIG. 12). In some examples one or more spokes 110 help position vent member 52' in a radial direction. In some examples, to achieve sufficient ventilating airflow, the vertical travel distance of vent member 52' is at least twenty percent of the vent member's outer diameter. In some examples, the vertical travel distance of vent member 52' is about 2.5 inches.

Figure 13:
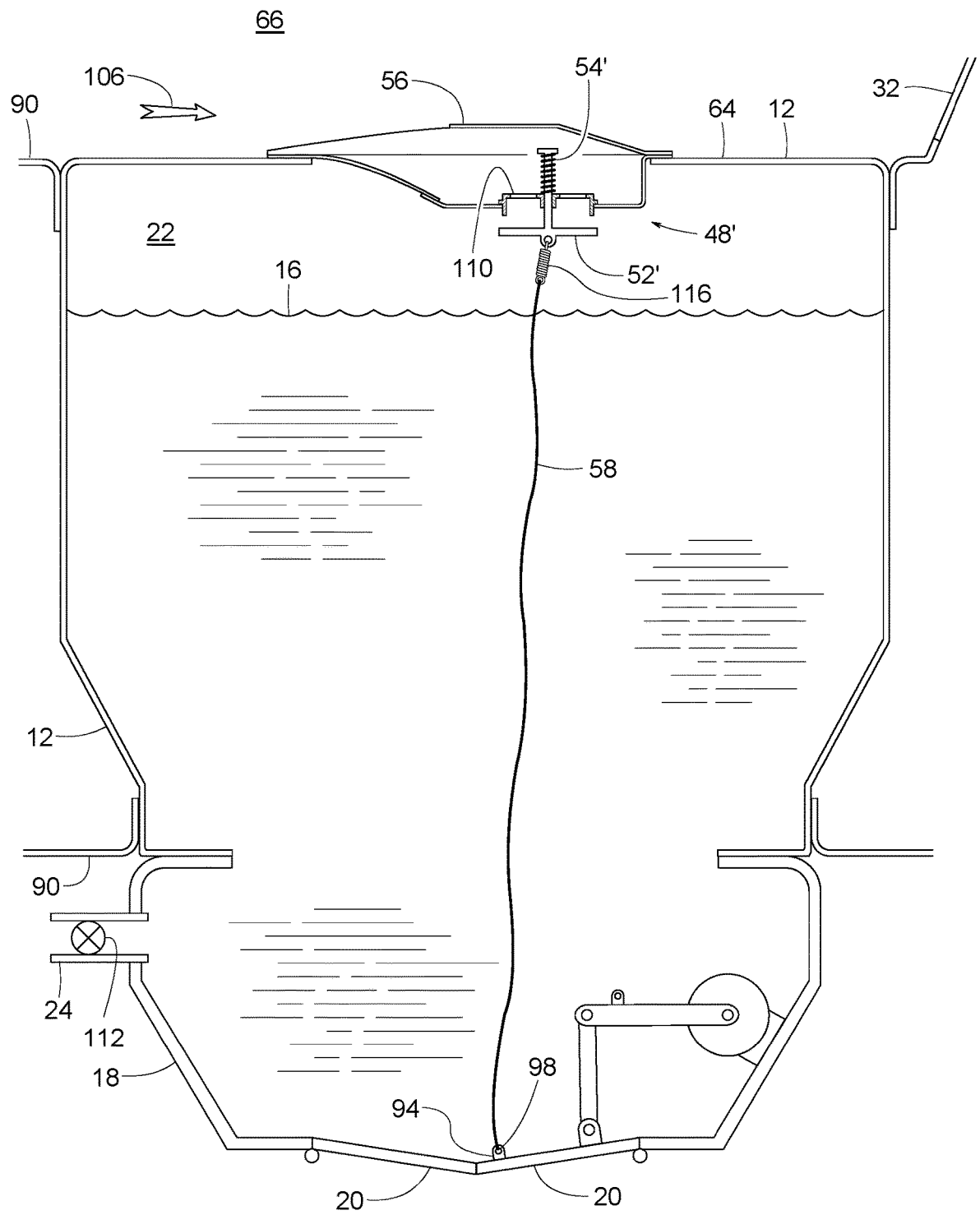
FIG. 13 is a cross-sectional side view similar to FIG. 11 but showing the vent system operating in a first mode of operation.
Figure 14:
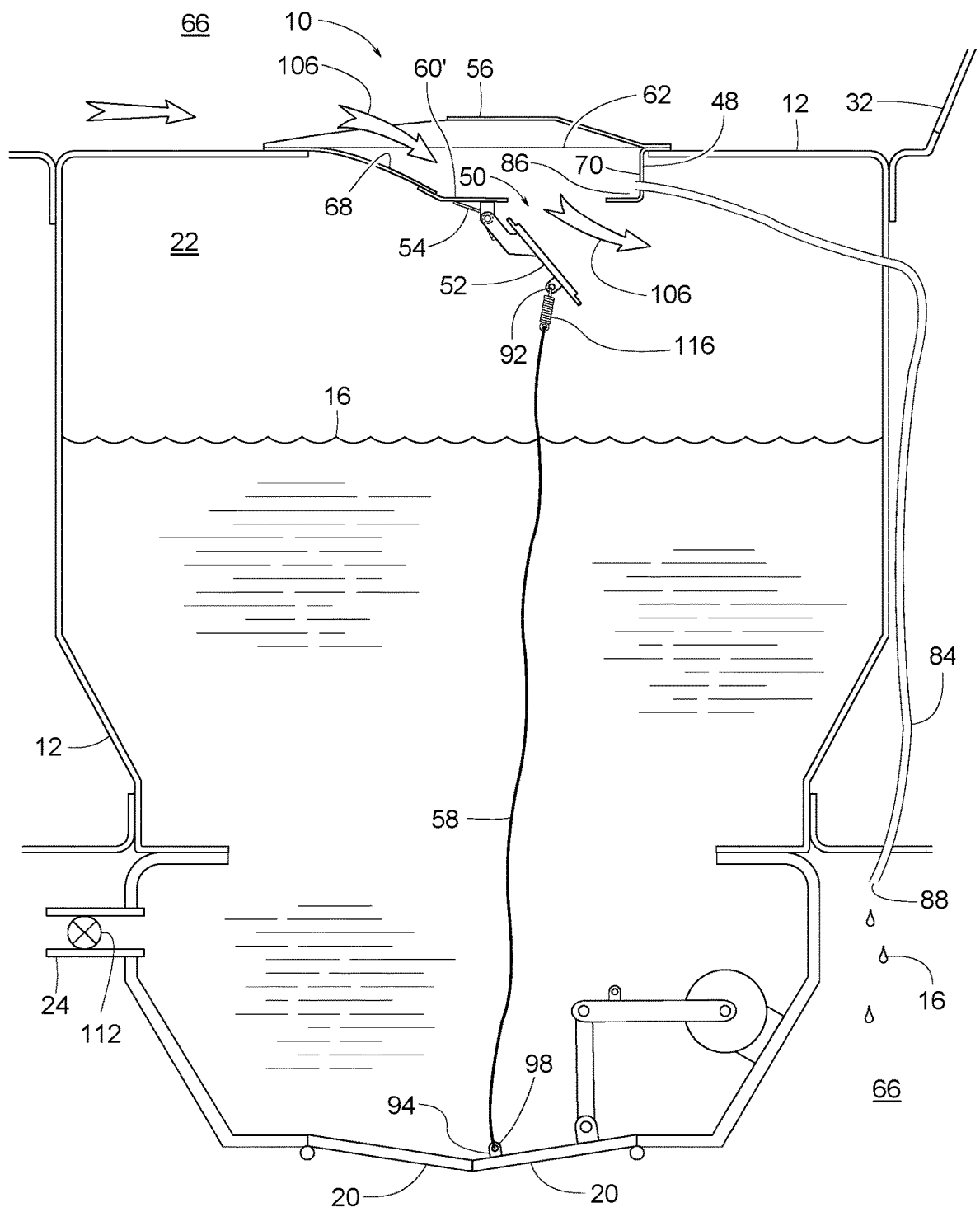
FIG. 14 is a cross-sectional side view similar to FIG. 7 but showing the vent system operating in a first mode of operation.

In addition or alternatively, some examples of vent system 10 have two modes of operation, e.g., a first mode and a second mode. Examples of first mode are shown in FIGS. 13 and 14. Examples of second mode are shown in FIGS. 2, 6, 8, 9 and 10.

In some examples of the first mode, vent member 52 or 52' of vent 48 or 48' moves independent of gate 20 from the sealed position to the unsealed position in response to the chamber pressure (i.e., the air pressure in chamber 22) decreasing a predetermined amount below the atmospheric pressure. In some examples, the predetermined amount is 0.8 psig below atmospheric pressure (i.e., −0.8 psig). So, in some examples, if the air pressure differential across vent member 52 or 52' reaches or exceeds 0.8 psig (at least 0.8 psig of vacuum in chamber 22), then the pressure differential will open the vent. In some examples, the predetermined amount is between about 1.5 psig to 2 psig below atmospheric pressure.

Such a first mode of operation helps avoid collapsing or otherwise damaging tank 12 under certain adverse pressure conditions. For instance, in some cases, fill valve 112 or gate 20 might leak. The lost fluid 16 could create excessive vacuum in chamber 22. In other cases, changes in elevation of aircraft 14 might create an adverse vacuum in chamber 22.

As a means for preventing damagingly high vacuum from developing within chamber 22, the first mode of operation allows vent member 52 and 52' to open independent of gate 20. So, in the first mode, vent members 52 and 52' can move regardless of whether gate 20 is open or closed.

In the second mode, vent members 52 and 52' can move independent of the chamber pressure from the sealed position to the unsealed position in response to gate valve assembly 10 applying a predetermined amount of tension 114 to slender member 58. The predetermined amount of tension 114 is that which is needed to overcome the force of vent closure spring 54 or 54'.

The second mode allows vent members 52 and 52' to open even when there is no pressure differential between the air pressure in chamber 22 and the outside atmosphere. The second mode of operation allows aircraft 14 to release fluid 16 at a maximum fluid flow rate, as vent system 10 does not require a vacuum or −0.5 psig in chamber 22 in order to function properly.

To prevent accidentally damaging vent system 10, some examples of slender member 58 include a tension-limiting spring 116 (e.g., an extension spring). Tension-limiting spring 116 can be installed anywhere along the length of slender member 58. If for some reason slender member 58 tries to exert excessive pulling force on vent member 52 or 52', tension-limiting spring 116 will yield (resiliently extend) to limit the slender member's pulling force (tension 114). Tension-limiting spring 116, for example, prevents an installer or mechanic from adjusting slender member 58 so tightly that it damages vent system 10. Under normal operation, tension-limiting spring 116 remains unextended regardless of whether vent system 10 is open or closed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A vent system in combination with an aircraft that can disperse a fluid while in-flight, the aircraft includes a nose, a tail, and a cockpit with a windshield; the aircraft defining a roll axis, a pitch axis, and a yaw axis; the aircraft extending lengthwise along the roll axis in a forward direction from the tail to the nose, the aircraft extending widthwise along the pitch axis, the aircraft extending along the yaw axis in an upward direction from a lower portion of the aircraft to an upper portion of the aircraft, the cockpit being between the tail and the nose with respect to the roll axis; the roll axis, the yaw axis, and the pitch axis lying perpendicular to each other, the vent system comprising:
- a tank between the cockpit and the nose, the tank defining a chamber for containing the fluid;
- a gate valve assembly underneath the tank and in fluid communication with the chamber, the gate valve assembly includes a gate that is movable selectively to an open position to release the fluid from the tank and a closed position to retain the fluid within the tank;
- a vent comprising a brim at an upper surface of the tank, the vent includes an inlet-well extending down from the brim, the inlet-well defining an aperture between the chamber and an outside atmosphere surrounding the aircraft, the aperture being at a lower end of the inlet-well, the inlet-well includes an upstream surface and a downstream surface, the aperture and the downstream surface are behind the upstream surface with respect to the forward direction along roll axis, the upstream surface extends downward from the brim toward the aperture, the downstream surface extends upward from the aperture;
- a vent member of the vent is movable downward from a sealed position to an unsealed position relative to the aperture, the vent member blocking fluid communication through the aperture when the vent member is in the sealed position, the aperture placing the chamber in open fluid communication with the outside atmosphere when the vent member is in the unsealed position;
- with respect to an imaginary plane passing through a centerpoint of the aperture and lying perpendicular to the pitch axis, the inlet-well at the aperture is at a well-depth of at least one inch lower than the brim at the upper surface of the tank and at least a portion of the upstream surface is sloped at an acute angle relative to the roll axis;
- a slender member having a length and a width, the length being at least ten times greater than the width, the slender member coupling the vent member to the gate valve assembly such that the gate moving between the closed position and the open position causes the vent member to move respectively between the sealed position and the unsealed position;
- a vent closure spring coupled to the vent member, the vent closure spring urging the vent member to the sealed position; and
- the vent closure spring holding the vent member at the sealed position when the gate is in the closed position, the slender member overpowering the vent closure spring to hold the vent member at the unsealed position when the gate is in the open position.

2. The vent system of claim 1, wherein the acute angle is less than 45 degrees.

3. The vent system of claim 1, wherein the upstream surface curves along the imaginary plane.

4. The vent system of claim 1, wherein the upstream surface is sloped more gradually than the downstream surface along the imaginary plane.

5. The vent system of claim 1, further comprising a scoop that extends to an uppermost height above the brim and extends at least partially over the aperture, and the well-depth is greater than the uppermost height of the scoop.

6. The vent system of claim 1, further comprising a scoop that extends at least partially over the aperture, and the scoop is substantially flush with the upper surface of the tank.

7. The vent system of claim 1, further comprising a drain tube defining an inlet and an outlet, the inlet being in fluid communication with the inlet-well at a point above the aperture and below the brim, and the outlet being below the inlet and below the aperture.

8. The vent system of claim 1, wherein the slender member includes a tension-limiting spring.

9. A vent system in combination with an aircraft that can disperse a fluid while in-flight, the aircraft includes a nose, a tail, and a cockpit with a windshield; the aircraft defining a roll axis, a pitch axis, and a yaw axis; the aircraft extending lengthwise along the roll axis in a forward direction from the tail to the nose, the aircraft extending widthwise along the pitch axis, the aircraft extending along the yaw axis in an upward direction from a lower portion of the aircraft to an upper portion of the aircraft, the cockpit being between the tail and the nose with respect to the roll axis; the roll axis, the yaw axis, and the pitch axis lying perpendicular to each other, the vent system comprising:
- a tank between the cockpit and the nose, the tank defining a chamber for containing the fluid;
- a gate valve assembly underneath the tank and in fluid communication with the chamber, the gate valve assembly includes a gate that is movable selectively to an open position to release the fluid from the tank and a closed position to retain the fluid within the tank;
- a vent at an upper portion of the tank and being above the gate valve assembly, the vent defining an aperture between the chamber and an outside atmosphere surrounding the aircraft, the vent including a vent member that is movable downward from a sealed position to an unsealed position, the vent member blocking fluid communication through the aperture when the vent member is in the sealed position, the aperture placing the chamber in open fluid communication with the outside atmosphere when the vent member is in the unsealed position;
- a vent closure spring coupled to the vent member, the vent closure spring urging the vent member upward to the sealed position; and
- a slender member having a length and a width, the length being at least ten times greater than the width, the slender member coupling the vent member to the gate valve assembly such that the gate moving between the closed position and the open position causes the vent member to move respectively between the sealed position and the unsealed position, the vent closure spring holding the vent member at the sealed position when the gate is in the closed position, the slender member overpowering the vent closure spring to hold the vent member at the unsealed position when the gate is in the open position.

10. The vent system of claim 9, wherein the slender member is a pliable elongate member.

11. The vent system of claim 9, wherein the slender member includes a tension-limiting spring.

12. The vent system of claim 9, wherein the vent includes a brim at an upper surface of the tank, the vent includes an inlet-well extending down from the brim, the inlet-well of the vent defines the aperture, the aperture is at a lower end of the inlet-well, the inlet-well includes an upstream surface and a downstream surface, the aperture and the downstream surface are behind the upstream surface with respect to the forward direction along roll axis, the upstream surface extends downward from the brim toward the aperture, the downstream surface extends upward from the aperture; and with respect to an imaginary plane passing through a centerpoint of the aperture and lying perpendicular to the pitch axis, the inlet-well at the aperture is at a well-depth of at least one inch lower than the brim at the upper surface of the tank and at least a portion of the upstream surface is sloped at an acute angle relative to the roll axis.

13. The vent system of claim 12, wherein the acute angle is less than 45 degrees.

14. The vent system of claim 12, wherein the upstream surface is sloped more gradually than the downstream surface along the imaginary plane.

15. The vent system of claim 12, further comprising a scoop that extends to an uppermost height above the brim and extends at least partially over the aperture.

16. The vent system of claim 15, wherein the well-depth is greater than the uppermost height of the scoop.

17. The vent system of claim 15, wherein the uppermost height of the scoop is less than three inches.

18. The vent system of claim 12, further comprising a scoop that extends at least partially over the aperture, and the scoop is substantially flush with the upper surface of the tank.

19. A vent system in combination with an aircraft that can disperse a fluid while in-flight, the aircraft includes a nose, a tail, and a cockpit with a windshield; the aircraft defining a roll axis, a pitch axis, and a yaw axis; the aircraft extending lengthwise along the roll axis in a forward direction from the tail to the nose, the aircraft extending widthwise along the pitch axis, the aircraft extending along the yaw axis in an upward direction from a lower portion of the aircraft to an upper portion of the aircraft, the cockpit being between the tail and the nose with respect to the roll axis; the roll axis, the yaw axis, and the pitch axis lying perpendicular to each other, the vent system comprising:
- a tank between the cockpit and the nose, the tank defining a chamber for containing the fluid, the chamber experiencing a chamber pressure;
- a gate valve assembly underneath the tank and in fluid communication with the chamber, the gate valve assembly includes a gate that is movable selectively to an open position to release the fluid from the tank and a closed position to retain the fluid within the tank;
- a vent at an upper portion of the tank and being above the gate valve assembly, the vent includes a brim at an upper surface of the tank, the vent includes an inlet-well extending down from the brim, the inlet-well of the vent defines an aperture between the chamber and an outside atmosphere surrounding the aircraft, the aperture is at a lower end of the inlet-well, the inlet-well includes an upstream surface and a downstream surface, the aperture and the downstream surface are behind the upstream surface with respect to the forward direction along roll axis, the upstream surface extends downward from the brim toward the aperture, the downstream surface extends upward from the aperture, the atmosphere being at an atmospheric pressure, the vent including a vent member that is movable downward from a sealed position to an unsealed position, the vent member blocking fluid communication through the aperture when the vent member is in the sealed position, the aperture placing the chamber in open fluid communication with the outside atmosphere when the vent member is in the unsealed position;
- a drain tube defining an inlet and an outlet, the inlet being in fluid communication with the inlet-well at a point above the aperture and below the brim, and the outlet being below the inlet and below the aperture;
- a vent closure spring coupled to the vent member, the vent closure spring urging the vent member upward to the sealed position; and
- a slender member having a length and a width, the length being at least ten times greater than the width, the slender member coupling the vent member to the gate valve assembly so as to provide the vent system with two modes of operation including:
  a) a first mode, wherein the vent member moves independent of the gate from the sealed position to the unsealed position in response to the chamber pressure decreasing a predetermined amount below the atmospheric pressure; and
  b) a second mode, wherein the vent member moves independent of the chamber pressure from the sealed position to the unsealed position in response to the gate valve assembly applying a predetermined amount of tension to the slender member.

20. The vent system of claim 19, wherein the slender member includes a tension-limiting spring.

* * * * *